US012095236B2

(12) United States Patent
Kostyukovich et al.

(10) Patent No.: US 12,095,236 B2
(45) Date of Patent: Sep. 17, 2024

(54) SPARK PLUG ELECTRODE AND SPARK PLUG HAVING THE SPARK PLUG ELECTRODE, AND PRODUCTION METHOD FOR THE SPARK PLUG ELECTRODE

(71) Applicant: Robert Bosch GmbH, Stuttgart (DE)

(72) Inventors: Egor Kostyukovich, Engels (RU); Lyubov Belyaeva, Engels (RU)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/043,945

(22) PCT Filed: Sep. 16, 2021

(86) PCT No.: PCT/EP2021/075411
§ 371 (c)(1),
(2) Date: Mar. 3, 2023

(87) PCT Pub. No.: WO2022/063660
PCT Pub. Date: Mar. 31, 2022

(65) Prior Publication Data

US 2024/0030688 A1 Jan. 25, 2024

(30) Foreign Application Priority Data

Sep. 23, 2020 (DE) ..................... 10 2020 211 897.3

(51) Int. Cl.

| | |
|---|---|
| *H01T 13/39* | (2006.01) |
| *C22C 5/04* | (2006.01) |
| *C22C 19/03* | (2006.01) |
| *H01T 21/02* | (2006.01) |

(52) U.S. Cl.
CPC ................ *H01T 13/39* (2013.01); *C22C 5/04* (2013.01); *C22C 19/03* (2013.01); *H01T 21/02* (2013.01)

(58) Field of Classification Search
CPC ................................ H01T 13/39; H01T 21/02
See application file for complete search history.

(56) References Cited

U.S. PATENT DOCUMENTS 10,033,163 B1 * 7/2018 Sumoyama ............. H01T 21/02
10,270,227 B2 * 4/2019 Hasegawa ............... H01T 13/32
2018/0331508 A1 11/2018 Hwang et al.

FOREIGN PATENT DOCUMENTS

| | | | |
|---|---|---|---|
| DE | 10224891 | A1 | 12/2003 |
| DE | 102005052425 | A1 | 5/2007 |
| DE | 102014225402 | A1 | 6/2016 |
| DE | 102015207042 | A1 | 10/2016 |
| DE | 102016223344 | A1 | 5/2018 |
| DE | 112016005813 | T5 | 8/2018 |
| DE | 102018120985 | A1 | 3/2019 |
| DE | 102018110571 | A1 | 11/2019 |
| EP | 2704271 | A2 | 3/2014 |
| JP | 2000068030 | A * | 3/2000 |

OTHER PUBLICATIONS

International Search Report for PCT/EP2021/075411, Issued Jan. 24, 2022.

* cited by examiner

*Primary Examiner* — Joseph L Williams
(74) *Attorney, Agent, or Firm* — NORTON ROSE FULBRIGHT US LLP; Gerard A. Messina

(57) ABSTRACT

An electrode for a spark plug. The electrode includes a base body made from a nickel base alloy, and a wear part made from an iridium base alloy. The wear part is both welded to the base body and connected by a keyed connection.

11 Claims, 3 Drawing Sheets

SPARK PLUG ELECTRODE AND SPARK PLUG HAVING THE SPARK PLUG ELECTRODE, AND PRODUCTION METHOD FOR THE SPARK PLUG ELECTRODE

BACKGROUND INFORMATION

An electrode for a spark plug is described in German Patent Application No. DE 10 2014 225402 A1, for example. In addition, a method for its production is described in this related art.

The production of the electrode and the connection of the base body to the wear part according to the related art presuppose the use of strong laser radiation at flat angles to the workpiece surface and are therefore relatively complex.

SUMMARY

An electrode according to the present invention is able to be produced in a relatively easy and robust manner with the aid of a method according to the present invention.

According to an example embodiment of the present invention, because a keyed connection also results between the base body and the wear part in addition to a weld between the base body and the wear part, the connection as a whole is stable and the requirements to be satisfied by the welded connection as such are less demanding, yet the electrode is still capable of withstanding all stresses that arise during an operation and in tests in a reliable manner over the long term.

The wear part may have the form of a truncated cone, that is, the form of a body which is created when all points of a flat base area are connected in a straight line to a tip, and the region of the tip is then removed by a cut along a sectional plane which runs parallel to the base area. The base area may be circular, which then produces a circular truncated cone. In addition, the connecting line of the circle center point of the base area may sit with its tip at a right angle to the base area, which thus results in a straight circular truncated cone, which is especially preferred within the scope of the present invention.

According to an example embodiment of the present invention, the base body may have an undercut recess, or in other words, a recess which widens in a direction from the surface toward the interior of the base body.

The keyed connection between the wear part and the base body may come about in particular by the positioning of a section of the wear part which includes the base area of the truncated cone in the undercut recess, and by the protrusion of a section of the truncated cone which includes the sectional area of the truncated cone, the truncated cone completely filling the undercut recess.

For this purpose, in a further refinement, the base body may be welded to the wear part at sections of the edge area of the recess or to the entire edge area of the recess.

According to an example embodiment of the present invention, it may furthermore be provided that the truncated cone starts from a straight circular cone so that it has an axis that is positioned perpendicular to the base area and the sectional area of the truncated cone, and has a base area radius rg and a sectional area radius rs and a height h. It may be provided that the base body has a planar surface laterally next to the recess, which is parallel to the base area and the sectional area of the truncated cone, and the base area is set apart from the surface by a melt-in length lin in the axial direction, that is, lies below this surface by the melt-in length lin. The wear part is then quasi accommodated in the base body or melted into the base body.

The following relations $$h<rs\text{, in particular } h<\tfrac{1}{2}rs, \tag{a}$$

$$rs<0.9rg\text{, in particular } rs<0.85rg, \tag{b}$$

$$lin<\tfrac{1}{2}h\text{, in particular } lin<\tfrac{1}{3}h, \tag{c}$$

may be realized by one, two or all relation(s), in particular the following relations: a; b; c; a and b; a and c; b and c; a, b and c.

With these designations, one half of the cone angle $\alpha$ (opening angle) of the cone on which the truncated cone is based amounts to $\alpha=\arctan(rg-rs)/h)$ and may preferably amount to between 10° and 40°, in particular to between 15° and 35°.

For example, 3 mm≥rg≥2 mm may be selected.

For instance, 1 mm≥h≥0.2 mm may be selected.

According to an example embodiment of the present invention, it may be provided that the base body has a circumferential welding bead between the recess and the planar surface, which laterally rests against the surface shell of the wear part; this enlarges the contact area between the wear part and the ground electrode and thereby improves the material connection.

In terms of the weight proportions, the nickel base alloy predominantly contains nickel. It may be NiAlxSiy or NiAlxSiyY, with 4≥x+y≥1 in each case, e.g., NiAl1Si1.

In terms of the weight proportions, the iridium base alloy predominantly contains iridium. For example, it may be made up completely of noble metals. It may be IrRhzReu with 16≥z+u≥3, e.g., IrRh8Re3.

The present invention also relates to a spark plug having at least one such electrode. It can be a center electrode and/or a ground electrode. The ground electrode may be a top electrode, a side electrode and/or a bow-shaped electrode.

According to an example embodiment of the present invention, such electrodes and spark plugs are able to be produced by the following method steps:

- Providing a preform base body having a planar surface made from a nickel base alloy;
- Providing a preform wear part in the shape of a truncated cone made from an iridium base alloy;
- Applying the base side of the preform truncated cone to the planar surface of the preform base body;
- Electrically contacting the preform wear part and the preform base body;
- Introducing an electric current, which flows between the preform wear part and the preform base body, so that the preform base body melts in the contact region of the preform wear part; and simultaneously introducing a mechanical force that acts between the preform wear part and the preform base body, resulting in:
- Penetration of the preform base body by the preform wear part, in the process of which the material of the preform base body displaced by the penetration accumulates at least partially at the circumferential area of the preform wear part, the preform wear part subsequently forming the wear part, and the preform base body forming the base body.

The method is able to be carried out in such a way that the electric current induces heating, which is always lower than the melting temperature of the iridium base alloy, for instance always lower than 1600° C. The form of the preform wear part then transitions without change to the form of the wear part and an especially pronounced keyed connection between the ground electrode and the wear part is able to be realized.

If the quotient of the mechanical force and the base area of the preform base body is selected in such a way that it corresponds to a mechanical pressure that amounts to between 40 and 300 N/mm$^2$, then the preform wear part rapidly penetrates the preform base body, and the production method is able to be carried out within a short time.

DETAILED DESCRIPTION OF EXAMPLE EMBODIMENTS

Figure 1:
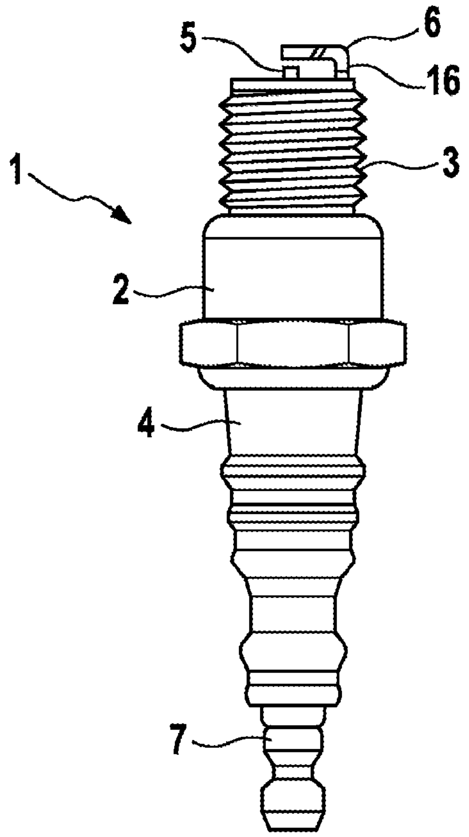
FIG. 1 shows an example of a spark plug.

FIG. 1 shows a schematic representation of a spark plug 1. Spark plug 1 has a metallic housing 2 including a thread 3 for an installation of spark plug 1 in an engine block. An insulator 4 is situated inside housing 2. A center electrode 5 and a terminal stud 7 are disposed inside insulator 4 and electrically connected via a resistance element, which is not shown here. In the example, center electrode 5 projects beyond the combustion-chamber side of insulator 4.

A ground electrode 6, which forms an ignition gap together with center electrode 5, is situated on the combustion-chamber side of housing 2. Ground electrode 6 may be embodied as a front electrode, a side electrode, or a bow-shaped electrode. The bow-shaped electrode has two sides which are welded to housing 2 by their leg 16 in each case. The sides have an angle of 30° to 180° relative to each other. The bow-shaped electrode may be made up of one part or multiple parts; in a multi-part development, the individual parts are connected to one another by a material connection such as welding.

Figure 2A:
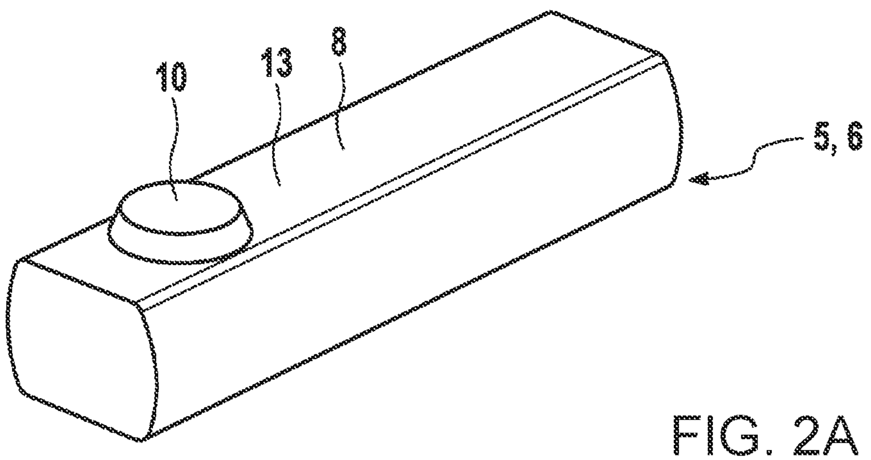
FIG. 2A-2C show an example of an electrode according to the present invention.
Figure 2B:
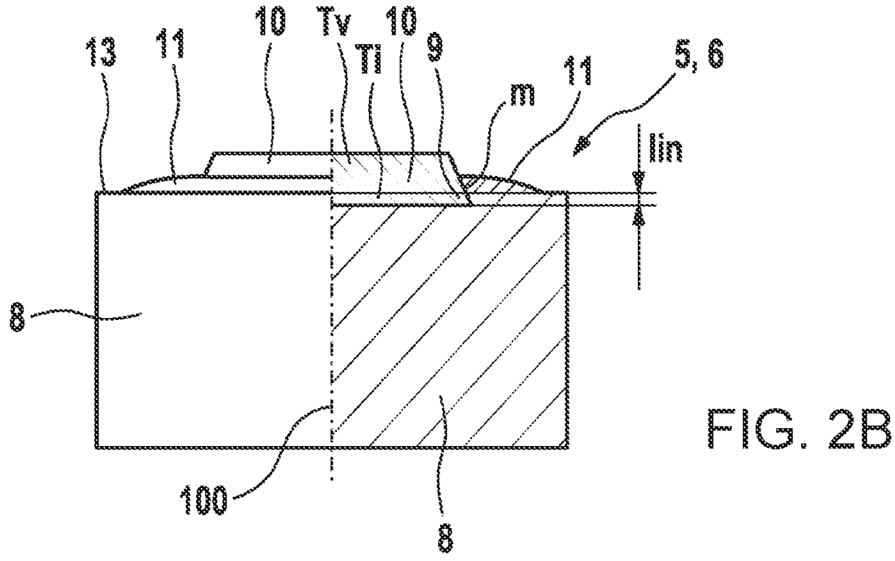
Figure 2C:
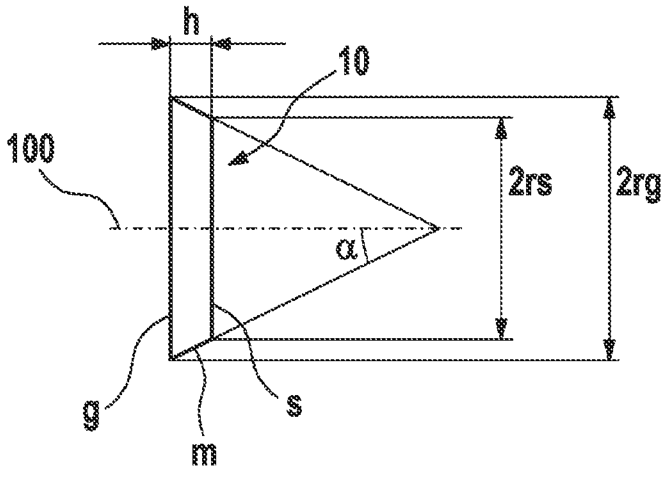

FIG. 2A shows a perspective view, and FIG. 2B shows a side view (left) and a sectional view (right) of an electrode 5, 6 according to the present invention. FIG. 2C separately shows a view of wear part 10.

Electrode 5, 6 has a base body 8 made from a nickel base alloy, and a wear part 10 made from an iridium base alloy. Wear part 10 is situated on base body 8 in such a way that it forms the ignition gap together with the oppositely situated electrode 6, 5 and a second wear part situated on electrode 6, 6 on the opposite side.

In the example, wear part 10 has the form of a straight truncated cone having a height h. The radius of base area g amounts to rg, and the radius of sectional area s amounts to rs.

Ground electrode 8 has an undercut recess 9, that is, recess 9 tapers in the direction of the external surface 13 of ground electrode 8 (in the upward direction in FIG. 2B). Situated in recess 9 is a part (Ti) of wear part 10, which includes base area g of the truncated cone, and a part (Tv) of the truncated cone, which includes the sectional area s of truncated cone, projects from recess 9 (in the outward/upper direction in FIG. 2B). The truncated cone completely fills undercut recess 9, and base body 8 is welded to wear part 10 at the edge area of recess 9.

External surface 13 of base body 8 is developed laterally next to recess 9 in the form of a planar surface which is parallel to base area g and to sectional area s of the truncated cone. Base area g is set apart from the planar surface by a melt-in length lin in an axial direction.

The following applies in the example: rg=1.2 mm; rs=1 mm; h=0.4 mm, lin=0.1 mm, or lin=0.05 mm. In the example, base body 8 is made from the material NiAl1Si1Y, and wear part 10 is made from the material IrRh8Re3.

It may be gathered from FIG. 2B that base body 8 has a circumferential welding bead 11 between recess 9 and planar surface 13, which rests laterally against surface shell m of wear part 10. In the example, the material of welding bead 11 is the material of base body 8, which was displaced in the production of electrode 5, 6 when recess 9 was created by the inmelting of wear part 10 into base body 8.

Electrode 5, 6 described in this example is able to be produced in the following manner, for example:

Step V1: Providing a preform base body having a planar surface made from a nickel base alloy;

Step V2: Providing a preform wear part in the form of a truncated cone made from an iridium base alloy;

Step V3: Applying the base side of the preform truncated cone to the planar surface of the preform base body (V3);

Step V4: Electrical contacting of the preform wear part and the preform base body;

Step V5: Introducing an electric current, which flows between the preform wear part and the preform base body so that the preform base body heats up in the contact region of the preform wear part (for instance to maximally 1400° C.), melts; and simultaneously Introducing a mechanical force, which acts between the preform wear part and the preform base body (step V6), for instance 500 Newton, resulting in:

Step V7: Penetration of the preform base body by the preform wear part, in the process of which the material of the preform base body displaced by the penetration accumulates at least partially at the circumferential area of the preform wear part in the form of a welding bead, the preform wear part subsequently forming wear part 10, and the preform base body forming base body 8.

Figure 3:
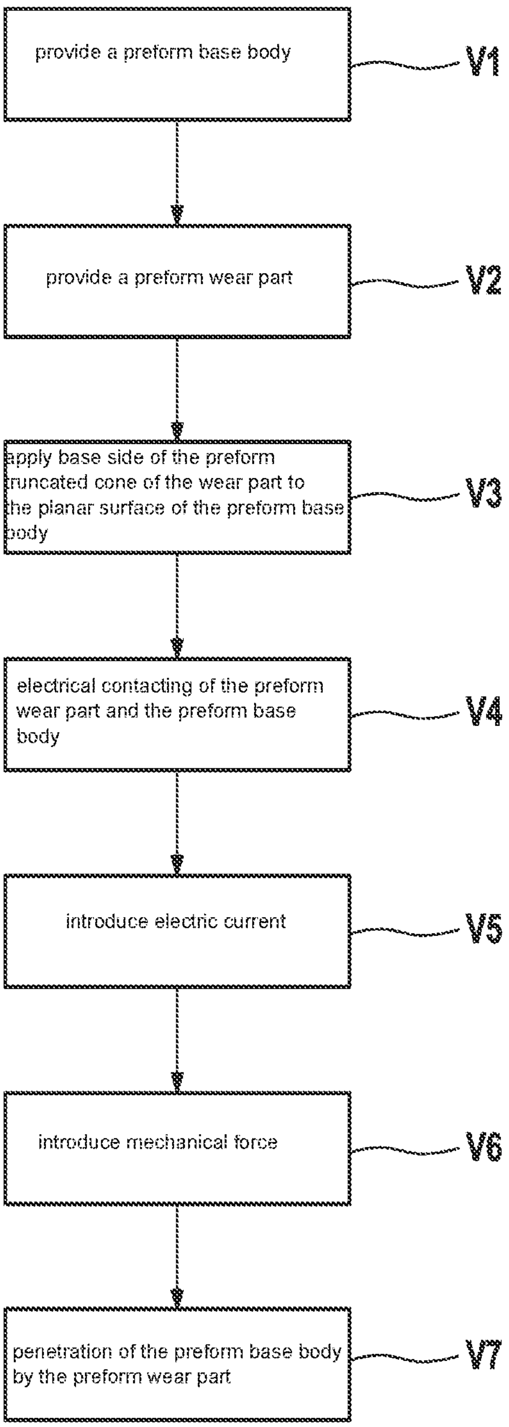
FIG. 3 shows an example of the production of a center electrode according to the present invention.

The method steps V1 through V7 are illustrated in FIG. 3.

What is claimed is:

1. An electrode for a spark plug, comprising:

a base body made from a nickel base alloy; and a wear part made from an iridium base alloy, wherein the wear part is both welded to the base body and connected to the base body by a keyed connection, wherein the wear part is in a form of a truncated cone, and the base body has an undercut recess in which a part of the wear part is situated includes a base area of the truncated cone from which a part of the truncated cone projects which includes a sectional area of the truncated cone, the truncated cone completely filling the undercut recess, and the base body being welded to the wear part at an edge area of the recess.

2. The electrode as recited in claim 1, wherein the truncated cone starts from a straight circular cone so that it has an axis that is positioned perpendicular to the base area and the sectional area of the truncated cone, and it has a base area radius and a sectional area radius and a height, the base body has a planar surface laterally next to the recess, which is parallel to the base area and/or the sectional area of the truncated cone, and the base area is set apart from the planar surface by a melt-in length in an axial direction.

3. The electrode as recited in claim 2, wherein one or more of the following relations is realized:

$$h<rs, \qquad a)$$

$$rs<0.9\ rg, \quad \text{b)}$$

$$lin<\tfrac{1}{2}h, \quad \text{c)}$$

where h is the height of the truncated cone, rs is the radius of the sectional area, rg is the radius of the base area, and lin is the melt-in depth.

4. The electrode as recited in claim 2, wherein one or more of the following relations is realized:

$$h<\tfrac{1}{2}rs, \quad \text{a)}$$

$$rs<0.85\ rg, \quad \text{b)}$$

$$lin<\tfrac{1}{3}h, \quad \text{c)}$$

where h is the height of the truncated cone, rs is the radius of the sectional area, rg is the radius of the base area, and lin is the melt-in depth.

5. The electrode as recited in claim 2, wherein the base body has a circumferential welding bead between the recess and the planar surface, which laterally rests against a surface shell of the wear part.

6. The electrode as recited in claim 1, wherein the nickel base alloy is NiAlxSiy or NiAlxSiyY, with 4≥x+y≥1; and the iridium base alloy is IrRhzReu with 16≥z+u≥3.

7. A spark plug, comprising:

at least one electrode including:

a base body made from a nickel base alloy, and a wear part made from an iridium base alloy, wherein the wear part is both welded to the base body and connected to the base body by a keyed connection, wherein the wear part is in a form of a truncated cone, and the base body has an undercut recess in which a part of the wear part is situated, including a base area of the truncated cone from which a part of the truncated cone projects which includes a sectional area of the truncated cone, the truncated cone completely filling the undercut recess, and the base body being welded to the wear part at an edge area of the recess.

8. A method for producing an electrode, comprising the following steps:

providing a preform base body having a planar surface made from a nickel base alloy;

providing a preform wear part in a shape of a truncated cone made from an iridium base alloy;

applying a base side of the preform truncated cone to the planar surface of the preform base body;

electrically contacting the preform wear part and the preform base body;

introducing an electric current, which flows between the preform wear part and the preform base body, so that the preform base body melts in a contact region of the preform wear part, and simultaneously with the introducing of the electric current, introducing a mechanical force that acts between the preform wear part and the preform base body, so that the preform base body is penetrated by the preform wear part, in the process of which a material of the preform base body displaced by the penetration accumulates at least partially at a circumferential area of the preform wear part, the preform wear part subsequently forming a wear part, and the preform base body forming a base body.

9. The method as recited in claim 8, wherein the electric current induces heating, which is always lower than the melting temperature of the iridium base alloy.

10. The method as recited in claim 9, wherein the heating is always lower than 1600° C.

11. The method as recited in claim 8, wherein a quotient of the mechanical force and the base area of the preform base body corresponds to a mechanical pressure which amounts to between 40 and 300 $N/mm^2$.

* * * * *